Jan. 25, 1966  R. J. HODEL ET AL  3,231,236
VALVE WITH REMOVABLE END CAPS
Filed June 26, 1963
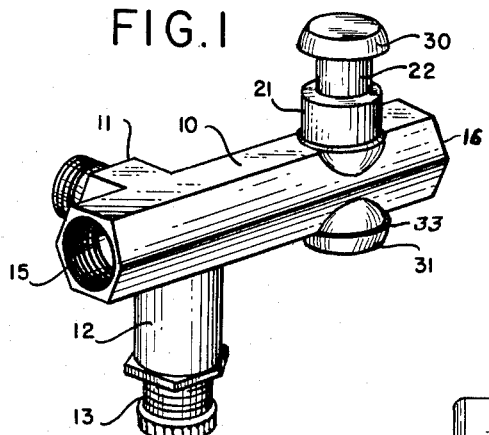
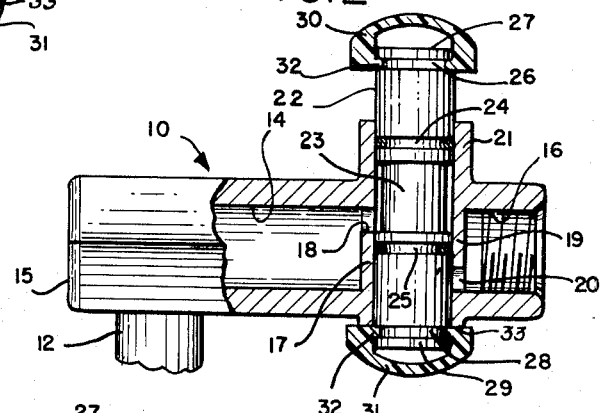
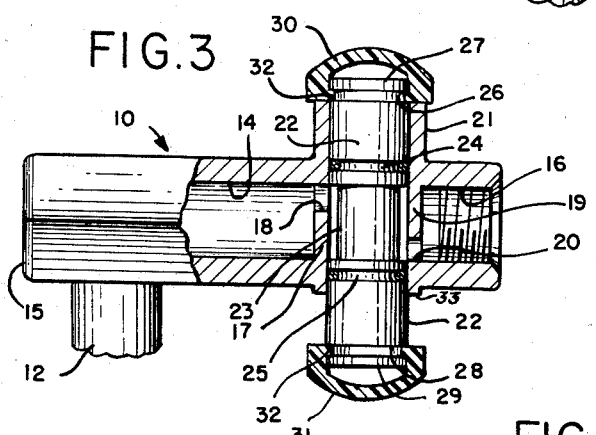
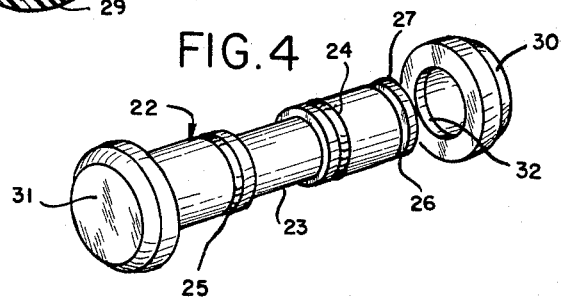
INVENTORS
R. J. Hodel
E. E. Bieri
BY
Morsell & Morsell
Attorneys … # 3,231,236
VALVE WITH REMOVABLE END CAPS
Raymond J. Hodel, Milwaukee, and Elmer E. Bieri, Menomonee Falls, Wis., assignors to Advance Tool & Die Casting Company, Milwaukee, Wis., a corporation of Wisconsin
Filed June 26, 1963, Ser. No. 290,821
1 Claim. (Cl. 251—324)

This invention relates to improvements in valves, and more particularly to an improved valve for use in an air compressor line or the like.

The principal objects of the present invention are to provide a reliable, manually-operated shut off valve which is simple and inexpensive in construction, easy to operate, and which may be quickly and easily disassembled for checking, cleaning, or replacement of seals.

A more specific object of the present invention is to provide a novel off-on valve assembly including a slidable transverse stem which can be manually reciprocated to open or close the valve passageway, and which stem is provided with end caps adapted to function as stop means to limit the axial travel of said stem, said caps being removable to permit the withdrawal of said stem from the valve body when desired.

Still further objects of the present invention are to provide an improved valve construction which is durable and long-lasting in use, and which is otherwise particularly well adapted for its intended purposes.

With the above and other objects in view, the present invention comprises the improved fluid valve assembly hereinafter described, and all of its parts and combinations, and all equivalents thereof.

In the accompanying drawing, wherein there is illustrated a preferred embodiment of the invention:

FIG. 1 is a perspective view of the complete valve assembly;

FIG. 2 is a fragmentary longitudinal sectional view showing the valve in its closed positon;

FIG. 3 is a similar sectional view showing the valve in its open position; and

FIG. 4 is a perspective view of the stem and cap unit incorporated in the present invention.

Referrig now more particularly to FIG. 1 of the drawing, the valve body is designated generally by the numeral 10, said body having a longitudinal bore or fluid flow passageway 14 therethrough (FIGS. 2 and 3) including an inlet end 15, which is internally threaded for coupling to an air compressor line or the like, and a threaded outflow end 16. The illustrated structure also includes a branch 11, for coupling to another fluid line or to a gauge, and depending from said valve body is a pressure-responsive relief valve mechanism 12 including a threaded adjustment member 13. Such safety relief devices are well known in the art and said element is not a critical part of the present invention. Similarly, additional lateral branches or arms may be formed on the valve, depending upon its intended use, and the invention is by no means to be limited or confined ot a structure identical in appearance or shape to that illustrated. What is novel in the present assembly is the design and operation of the valve opening and closing mechanism, and the facility with which the unit may be disassembled, as will be hereinafter described.

With reference now to FIGS. 2 and 3 of the drawing, it will be seen that in accordance with the present invention there is formed in the interior of the valve body 10 a first transverse partition wall 17 having an orifice 18 therethrough adjacent the upper peripheral portion of the valve passageway, and spaced from said first partition is a second partition wall 19 having an orifice 20 therethrough adjacent the lower peripheral portion of said valve as it appears in the drawing, it being understood that the illustrated valve structure can be inverted or mounted in any desired position in a line, depending upon the requirements of the particular installation. Said spaced partitions 17 and 19 have concave opposed faces defining a transverse bore within said valve body, the body wall being provided with openings therethrough in registration with said transverse bore and formed on and projecting upwardly from the valve is a neck 21 having a bore therethrough in alignment with and forming a continuation of said transverse bore.

Slidably mounted within the transverse bore formed by the partitions 17 and 19 is a cylindrical stem 22 having outwardly-projecting end portions, said neck 21 forming an extended guide bearing therefor. Said stem is provided with an annular recess or cut-out portion 23 intermediate its length which is dimensioned to provide communication between the aforementioned, non-aligned orifices 18 and 20 when the stem is in the lowered position of FIG. 3, and when said slidable stem is manually reciprocated to the position of FIG. 2 said annular recess registers only with the orifice 18.

Formed in said stem 22 and spaced axially on both sides of said annular recess 23 are grooves having O-type, resilient sealing rings 24 and 25 therein which are designed to sealingly engage against the wall of said stem bore to provide a fluid-tight seal between said relatively movable elements. Thus, when said stem 22 is in the raised position of FIG. 2, fluid entering the inlet end 15 of the valve and passing through the orifice 18 is prevented by said sealing ring 25 from flowing through the stem bore, since the stem annular recess is out of registration with the lower orifice 20, and the valve is effectively closed. When the valve stem 22 is in the lowered position of FIG. 3, however, fluid entering the orifice 18 flows through the annular space or channel provided by said recess 23 and out the registering orifice 20, the sealing ring 25 being positioned therebelow, as shown. Thus, when the stem 22 is in its lowered position the valve is open, and fluid is permitted to flow therethrough and out the discharge end 16. Ordinarily, a thin film of lubricating oil is applied to said stem 22 to facilitate its sliding movement, but this is not a critical feature of the invention.

As is illustrated, the stem 22 is provided with annular grooves 26 and 28 adjacent its upper and lower ends, respectively, and mounted on said stem ends are enlarged caps 30 and 31 formed of a flexible plastic material. Said caps are provided with radially inwardly projecting, annular lips or shoulders 32 which are adapted to be temporarily flexed and snapped into said stem grooves 26 and 28 to maintain said caps in position on the stem. Said enlarged caps 30 and 31 not only facilitate the manual reciprocation of the slidable valve stem, but they function as stop means designed to abut against stop shoulders provided by the upper end face of the neck 21 and by a shoulder 33 formed on the underside of the body, said stops limiting the maximum reciprocal movement of the stem to the positions representing its full open and full closed conditions. If it should be desired to check or replace the sealing rings 24 and 25, however, or to add lubricant, it is merely necessary to manually force one of said flexible caps from the stem 22, and said stem may then be readily withdrawn from the valve body. To re-assemble the valve, the stem is repositioned therein and the cap snapped onto the end of said stem again.

In the use of the present valve assembly, when fluid is present therein it creates equal pressure on said valve stem in both axial directions, thus eliminating the possibility of said stem being forced either upwardly or downwardly by said fluid pressure. This is an important feature of the present valve construction as it provides a valve which is reliable and will not inadvertently shift from its open or closed position.

From the foregoing description it will be appreciated that the present invention provides a novel valve assembly for use in pneumatic or hydraulic devices which is simple and reliable in operation, and which is relatively inexpensive in design and construction. Moreover, with the present improved design, the unit may be readily dissembled for inspection or servicing, and no special tools are required.

It is to be understood, of course, that the present invention is not to be limited or confined to a structure identical in all respects to that shown and hereinabove described. It is contemplated that various changes or modifications will occur to those skilled in the art, and it is intended to include herein not only the illustrated design, but also any and all modifications or changes therein as may come within the spirit of the invention and within the scope of the following claim.

What we claim is:

A fluid valve comprising: a body having a longitudinal fluid passageway therethrough with an inlet end and an outlet end, and said body having a pair of opposed openings therethrough intermediate said ends; a pair of spaced partition walls in said body passageway, said spaced walls having concave opposed faces defining a cylindrical, transverse stem bore in registration with said opposed body openings, said partitions having a pair of non-aligned orifices therethrough; a neck member formed on the exterior of said body and projecting outwardly therefrom in alignment with said stem bore, said neck member having a bore therethrough in communication with said stem bore, and said neck member forming an extended guide bearing; a cylindrical stem axially slidably mounted in said bore and extending transversely through said body with end portions extending therebeyond, said stem having an annular recess intermediate its length, and said stem being manually axially slidable in said bore from an open position wherein said annular recess registers with and provides communication between said non-aligned partition orifices to a closed position where said annular recess is out of registration with one of said orifices; resilient sealing rings mounted on and around said stem in axially spaced relationship on each side of said intermediate recessed portion, said rings sealingly engaging the inner peripheral surface of said stem bore; an annular groove formed in said stem adjacent each projecting end thereof; and a cap mounted on each end of said stem, said caps having inwardly projecting flexible annular shoulders adapted to be flexed and snapped into said stem grooves to removably maintain said caps on said stem ends, said caps facilitating the manual reciprocation of said stem, and providing stop means engageable with said valve body to limit the axial travel of said stem.

References Cited by the Examiner

UNITED STATES PATENTS

| | | | |
|---|---|---|---|
| 2,713,989 | 8/1955 | Bryant | 251—324 |
| 2,837,374 | 6/1958 | Lipman | 251—319 X |
| 2,920,861 | 1/1960 | Hartmann | 251—368 X |
| 3,006,558 | 10/1961 | Jacobs | 251—368 X |

FOREIGN PATENTS 1,226,706  2/1960  France.

M. CARY NELSON, *Primary Examiner.*